United States Patent [19]

Muraoka

[11] Patent Number: 4,466,031
[45] Date of Patent: Aug. 14, 1984

[54] MAGNETIC DISC APPARATUS
[75] Inventor: Takao Muraoka, Kawasaki, Japan
[73] Assignee: Tokyo Shibaura Denki Kabushiki Kaisha, Kawasaki, Japan
[21] Appl. No.: 505,484
[22] Filed: Jun. 17, 1983
[30] Foreign Application Priority Data Jun. 30, 1982 [JP] Japan ................................ 57-112957

[51] Int. Cl.³ ........................ G11B 5/012; G11B 25/04
[52] U.S. Cl. ........................................ 360/97; 360/133
[58] Field of Search ................................. 360/97–99, 360/132, 133, 135

[56] References Cited

U.S. PATENT DOCUMENTS

| 4,224,648 | 9/1980 | Roling | 360/135 X |
| 4,320,425 | 3/1982 | Hall | 360/97 |
| 4,358,803 | 11/1982 | Van der Giessen | 360/99 |
| 4,391,543 | 7/1983 | Elsing | 360/97 X |

FOREIGN PATENT DOCUMENTS 558301 6/1977 U.S.S.R. ................................ 360/97

Primary Examiner—John H. Wolff
Attorney, Agent, or Firm—Oblon, Fisher, Spivak, McClelland & Maier

[57] ABSTRACT

A floppy disc has a disc holder provided at the center of a disc-shaped recording medium. The disc holder is formed of a magnetic material and has a central bore at its center. A rotating member has a cylindrical rotating shaft portion and a flanged portion and has a cylindrical bore at its center. A center spindle has a base portion slidable within this cylindrical bore and an engaging portion engageable with the central bore. A rotating shaft of a motor is fitted into the cylindrical bore, whereby the rotating member is driven to rotate by the driving operation of the motor. A compression spring is mounted between the center spindle and the rotating shaft, whereby the center spindle is urged by this compression spring in a direction permitting the engaging portion to protrude from the rotating member. The disc holder and the rotating member are fixed to each other by the magnetic force. In this state, the engaging portion engages the central bore, and thus, the center of the floppy disc is brought into alignment with the center of the rotating member.

3 Claims, 9 Drawing Figures

FIG. 5
FIG. 6
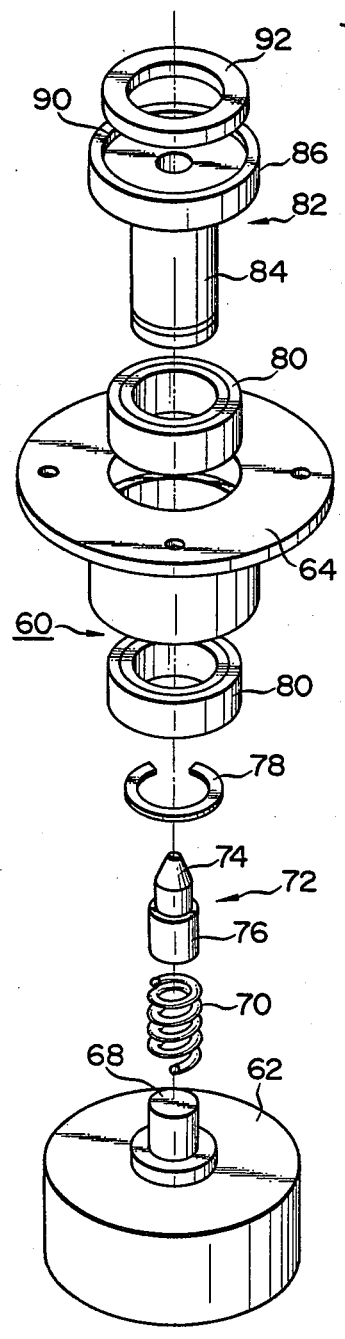
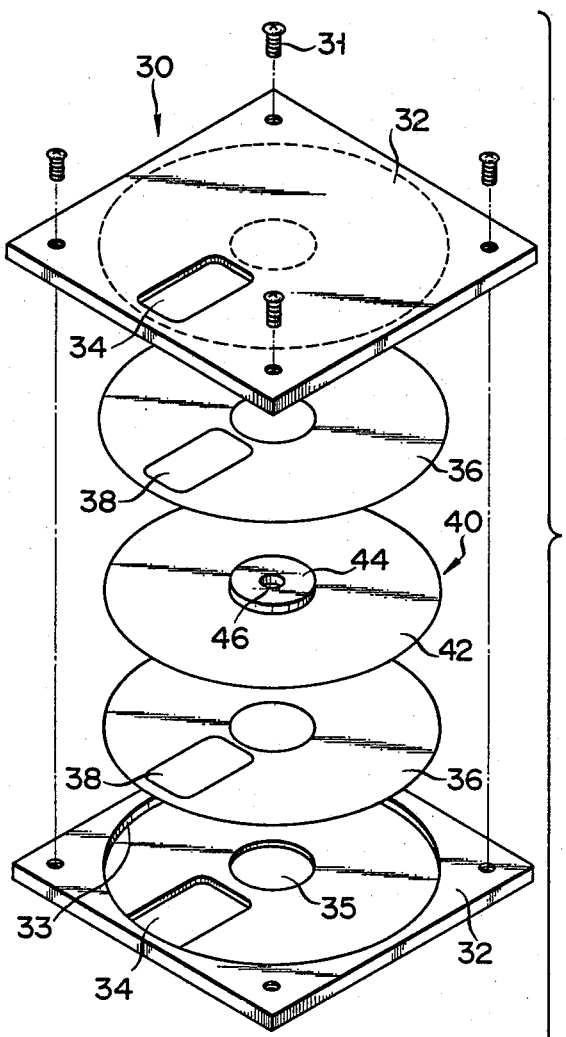

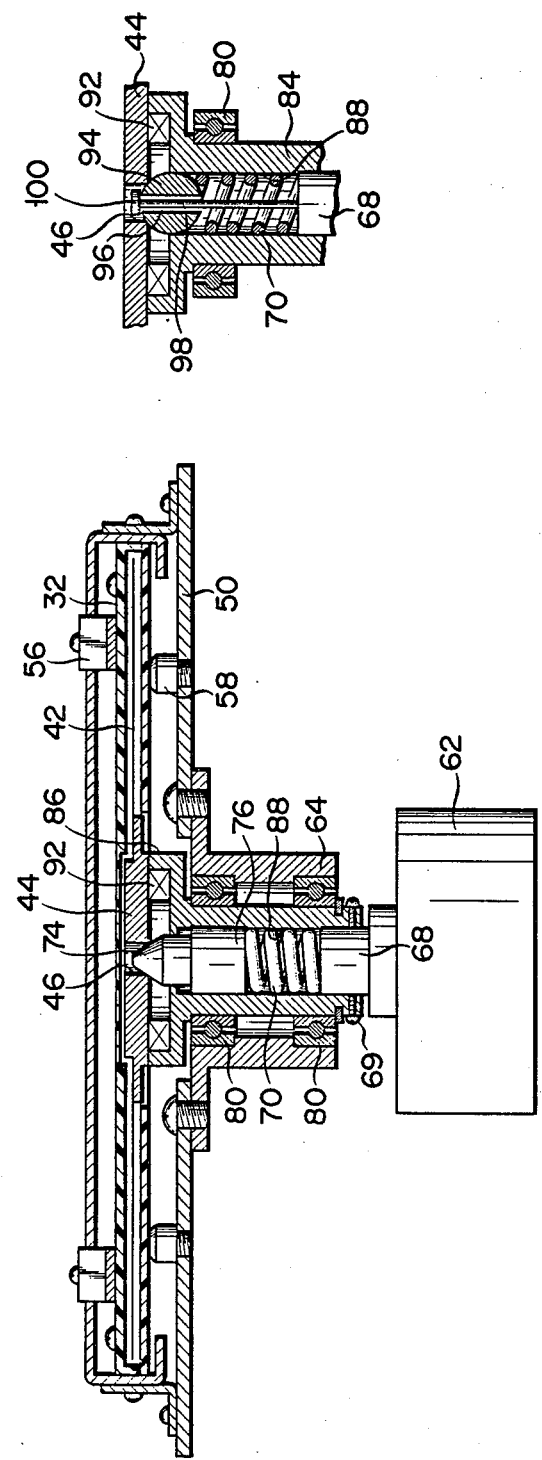

MAGNETIC DISC APPARATUS

BACKGROUND OF THE INVENTION

The present invention relates to a magnetic disc apparatus which permits the center of a magnetic disc to be precisely brought into alignment with the center of rotation.

A flexible magnetic recording medium, or floppy disc, has the advantage that it is inexpensive and easy to handle. For this reason, a magnetic disc apparatus using such a floppy disc has become very popular in recent years. In accordance with a demand for miniaturization of this magnetic disc apparatus, the floppy disc itself, which initially had a diameter of 8 inches, has been reduced to a diameter of 5 inches or even 3 inches. In order to reduce the size of the floppy disc while still providing a satisfactory storing capacity as a recording medium, it is necessary not only to increase the signal recording density per recording track, but also to increase the density of the recording tracks as well. Where the recording tracks are closer together, in order to prevent a magnetic head from disengaging from the track of the rotating floppy disc, it is necessary to have the center of the floppy disc brought exactly into alignment with the center of rotation of a disc-rotation driving means. In a floppy disc mounting mechanism of the conventional magnetic disc apparatus, however, it is impossible to obtain a highly precise alignment of the floppy disc and the disc-rotation driving means.

FIGS. 1(a) and (b) and FIG. 2 each show a floppy disc mounting mechanism of a prior art magnetic disc apparatus. In FIG. 1, a floppy disc 10 has at its center a circular bore 12. A lower holder 14 of the rotation driving means has a convex portion 14a at its upper surface, while an upper holder 16 thereof has a concave portion 16a at its lower surface. Onto this convex portion 14a, the circular bore 12 and the convex portion 16a of the upper holder 16 are fitted. Thus, the center of rotation of the floppy disc 10 is positioned and sandwiched between the holders 14 and 16. The floppy disc 10 is formed of, for example, a flexible polyester sheet having a thickness of several micrometers (μm). On the other hand, the disc holder 16 is formed of rigid material. For this reason, where the bore 12 of the floppy disc 10 is deviated from the convex portion 14a at the time of fitting the disc 10 between the upper and lower holders 16 and 14, a portion of the floppy disc 10 neighboring the bore 12 is torn to bend the floppy disc 10. The precision of aligning the center of rotation of the floppy disc 10 is determined depending upon the precision of fabricating the bore 12 and the upper and lower olders 14 and 16. For this reason, the error made in positioning the rotational center of the floppy disc 10 amounts to, in most cases, from several micrometers to several hundreds of micrometers.

In FIG. 2, a rigid holder 18 is mounted on a central portion of the floppy disc 10. This holder 18 has at its center a rotational-center positioning or aligning bore 20 formed in a rectangular shape, and has toward its peripheral edge a similar-shaped disc-rotation driving bore 22. A columnar projection 26 to be fitted into the bore 20 is provided at a rotational center position of the upper surface of a spindle 24, and a columnar projection 28 to be fitted into the bore 22 is provided at a position toward the peripheral edge portion of the upper spindle surface. When the floppy disc 10 is kept in a state wherein it is mounted upon the rotation driving means, the circumferential surface of the projection 26 is kept in contact with two sides of the bore 20, whereby the center of rotation of the floppy disc 10 is positioned. Also in this case, the precision of fabricating the projection 26 of the spindle 24 and the bore 20 of the holder 18 affects the precision of aligning the center of rotation of the spindle 24 with the center of rotation of the floppy disc 10. Further, the columnar projection 28 is so urged as to be tilted in a direction such that the projection 28 goes away from the projection 26 so that the projection 26 may be brought into contact with a specified two of the sides of the bore 20. It is difficult to manufacture the spindle 24 having such a complicated structure. Since the projection 26 and the bore 20 contact each other at two points, this apparatus has the drawback that the contacting portions are liable to be worn by a centrifugal force generated when the floppy disc 10 is allowed to rotate at high speed. As mentioned above, in the prior art magnetic recording apparatus for use with a floppy disc, the precision with which the center of rotation of the floppy disc is aligned with that of the disc-rotation driving means decreases. This is a primary cause hindering the miniaturization of the floppy disc. Further, the prior art magnetic disc apparatus has the drawback that its structure is complicated and expensive to manufacture.

SUMMARY OF THE INVENTION

Accordingly, an object of the present invention is to provide a magnetic disc apparatus which is capable of bringing the center of a magnetic disc into precise alignment with the rotational center of a disc-rotation driving means.

Another object of the present invention is to provide a magnetic disc apparatus which is capable of reliably mounting a magnetic disc without leading to degradation of the same.

Still another object of the present invention is to provide a magnetic disc apparatus which is simple in structure and high in practicability.

According to the present invention, there is provided a magnetic disc apparatus which has a magnetic recording disc-member and a disc-rotation driving means arranged to support and rotate this magnetic recording disc-member. The magnetic recording disc member has a magnetic recording disc medium onto which information is written and from which information is read, and a disc holder on which the magnetic recording disc medium is mounted. The disc holder has an engaging bore at the central position of the magnetic recording disc medium. The disc-rotation driving means has an engaging member having a tip end portion and a base end portion and inserted from the tip end portion into the engaging bore of the disc holder and engageable with said engaging bore at its midway position, a rotating member supporting the engaging member so that this engaging member may be movable in a direction connecting the tip end portion and the base end portion, said rotating member being rotatable about the engaging member, and an urging means for urging the engaging member toward the tip end portion thereof. The rotating member has a disc-holder engagement portion capable of being engaged with the disc holder. A retainer means retains the disc holder in a state wherein this holder is kept engaged with the holder engagement portion. A driver member drives the rotating member for rotation.

In the present invention, when the engaging member is brought into engagement with the engaging bore, the magnetic recording disc medium is held in a direction perpendicular to that in which the engaging member is moved. For this reason, even if dimensional errors are made in either or both the engaging bore and the engaging member, the position of engagement between the two is not varied in the direction perpendicular to said moving direction although it may be varied in said moving direction. Accordingly, the center of rotation of the magnetic recording disc medium and the center of rotation of the rotating member are always made to coincide with each other regardless of the precision with which the engaging bore and the engaging member are respectively fabricated. On the other hand, the disc holder is retained by said retainer means in a state wherein it is kept in engagement with the disc-holder engagement portion of the rotating member. Thus, the magnetic recording disc member is coupled with the rotating member. For this reason, the position of the magnetic recording disc medium taken in said moving direction is also set with high precision at a specified location. Thus the fabrication of the disc holder and the engaging member is not always required to be so highly precise. For this reason, the magnetic recording disc member is easy to manufacture and is low in manufacturing cost. Further, the disc-rotation driving means is also simple in structure and is therefore easy to manufacture.

BRIEF DESCRIPTION OF THE DRAWINGS

FIG. 5 is a perspective exploded view showing the disc-rotation driving means;

FIG. 6 is a perspective exploded view showing the disc cassette;

FIG. 7 is a side sectional view showing a state wherein the magnetic disc apparatus is in operation; and FIG. 8 is a side sectional view showing a center spindle of the magnetic disc apparatus according to another embodiment of the invention.

DETAILED DESCRIPTION OF THE PREFERRED EMBODIMENTS

Figure 1:
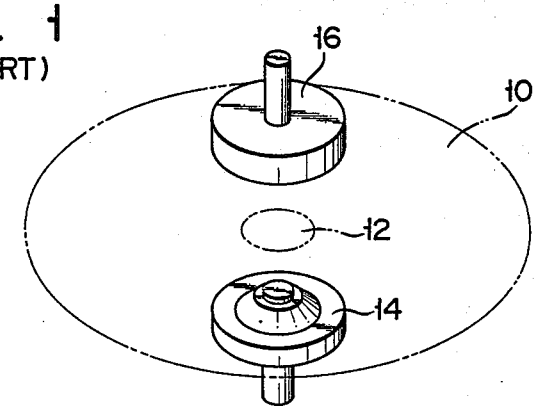
FIGS. 1(a) and 1(b) are a perspective view and side sectional view, respectively, of a prior art magnetic disc apparatus.
Figure 1:
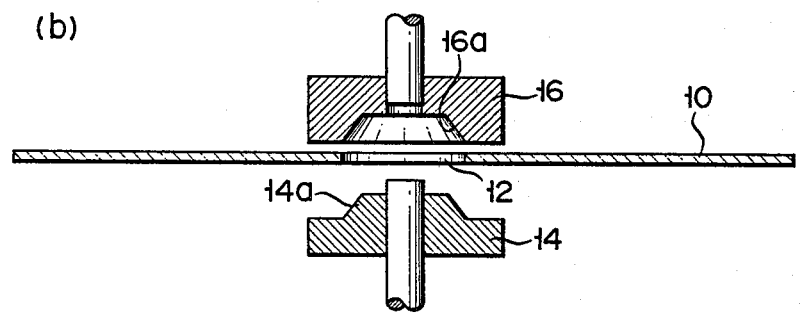
Figure 2:
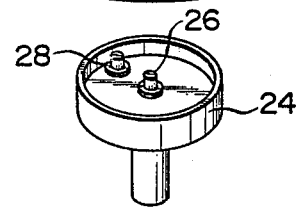
FIG. 2 is a perspective view showing a prior art magnetic disc apparatus.
Figure 3:
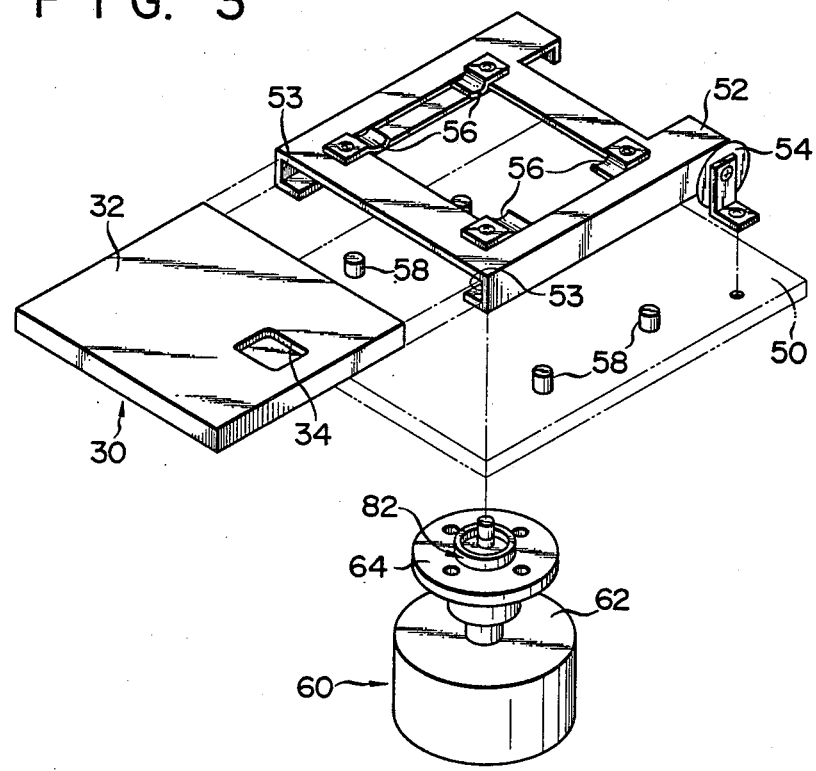
FIG. 3 is a perspective view showing a disc-cassette holder and disc-rotation driving means of a magnetic disc apparatus according to an embodiment of the invention.

In FIGS. 3 to 7, a magnetic recording disc apparatus according to an embodiment of the invention is shown. A disc cassette 30 having received therein a floppy disc 40 is inserted into a cassette holder 52 mounted on a base plate 50 of a main body of the magnetic recording disc apparatus as shown in FIG. 3. Referring to FIG. 6, the disc cassette 30 has a pair of cassette cases 32 shaped in a rectangular planar configuration. A circular recess 33 is formed in each of the respective opposed surfaces of the cassette cases 32. A circular liner 36 is adhered to the circular recess 33 of each cassette case 32. A floppy disc 40 is received in between these liners 36. The cassette cases 32 and the liners 36 have windows 34 and 38, respectively, for permitting a magnetic head (not shown) to magnetically record or read a signal on or from the floppy disc 40. One of the cassette cases 32 has at its center an opening 35 for transmitting a driving force of a disc-rotation driving means 60 (see FIG. 3) to the floppy disc 40. The paired cassette cases 32 are fixed by bolts in a state wherein the floppy disc 40 is received in the recesses 33.

The floppy disc 40 has a circular recording medium 42 and a disc holder 44 provided at its center. The disc holder 44 is formed into a circular plate-like structure formed of magnetic material and its outer circumferential surface has a stepped configuration consisting of a large-diameter portion and a small-diameter portion, as shown in FIG. 7. The circular recording medium 42 has a circular bore at its center, said bore being fitted onto the small-diameter portion of the disc holder 44. The recording medium 42 and the disc holder 44 are adhered to each other at the large-diameter portion of the latter. The disc holder 44 has a central cylindrical bore 46 at its center.

The cassette holder 52 is tiltably mounted, through a tilting member 54, to the base plate 50 of the main body of the magnetic recording disc apparatus as shown in FIG. 3. The cassette holder 52 has a pair of guides 53 provided on the two opposed inner faces, respectively, and has a flexible piece 56 on its upper surface. Pins 58 are provided on the upper surface of the base plate 50. With the cassette holder 52 inclined, the disc cassette 30 is inserted into this cassette holder 52 along the paired guides 53 thereof. Subsequently, the cassette holder 52 is tilted and is thereby made parallel to the base plate 50. The cassette case 32 is thereby pushed downwards by means of the elastic piece 56 and is thus brought into contact with the pins 58. The disc cassette 30 is thereby mounted within the cassette holder 52 and its vertical position relative to the base plate 50 is determined by the pins 58.

Figure 4:
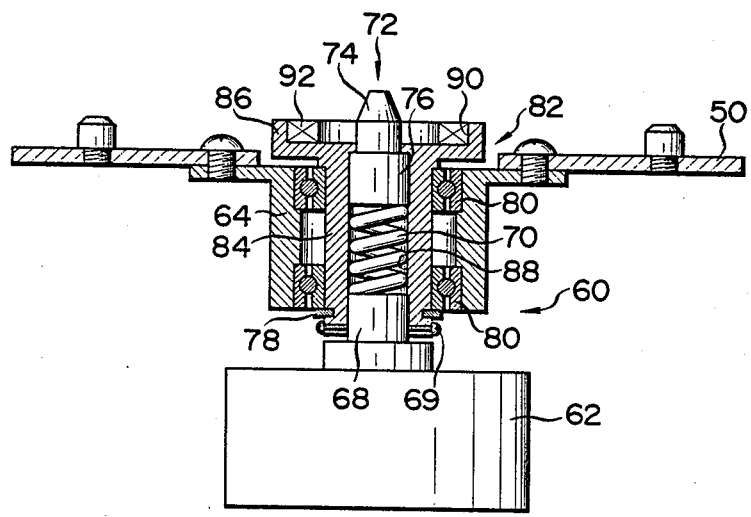
FIG. 4 is a side sectional view showing the disc-rotation driving means.

The portion of the base plate 50 corresponding to the disc holder 44 of the disc cassette 30 mounted within the cassette holder 52 is bored in circular form, and at this position a disc-rotation driving means 60 is disposed. As shown in FIGS. 4 and 5, the disc rotation driving means 60 mainly has a motor 62, a center spindle 72 and a rotating member 82. A cylindrical supporting member 64 which has a flange formed at its upper end is fixed to the base plate 50 via a bolt 66. The cylindrical supporting member 64 is provided with ring-like bearings 80 at its upper and lower portions. The rotating member 82 is rotatably supported by the cylindrical supporting member 64 via the bearings 80.

The rotating member 82 has a cylindrical rotating shaft portion 84 and a flanged portion 86 formed on the upper end of this rotating shaft portion 84. The rotating member 82 has in its interior a cylindrical bore 88 extending coaxially with the rotating shaft portion 84 in the longitudinal direction thereof. The rotating shaft portion 84 is inserted inside the bearing 80 and has a ring-like piece 78 fitted thereon from outside at its lower end, thereby fixing the inner surface of the bearing 80 to the rotating member 82. The flanged portion 86 has a circular recess 90 at its upper surface. In this recess 90, a ring-like magnet 92 serving as a retainer means is received.

The engaging member or center spindle 72 has an engaging portion 74 at its upper side and a base portion 76 at its lower side. The base portion 76 is made columnar and also slidable within the cylindrical bore 88. The engaging portion 74 has a columnar portion at the side of the base portion and a frusto-conical portion at its tip end side. The columnar portion of the engaging portion 74 is smaller in diameter than the base portion 76. The upper end portion of the cylindrical bore 88 has a reduced diameter substantially equal to that of the columnar portion of the engaging portion 74. The engaging portion 74 is allowed to pass through the upper end portion of the cylindrical bore 88, but the base portion 76 is allowed to engage the cylindrical bore 88 at the upper end portion thereof. The diameter of the upper end portion of the frusto-conical portion of the engaging portion 74 is smaller than the diameter of the central bore 46 of the disc holder 44, and the diameter of its lower end portion is larger than the diameter of said central bore 46. The columnar portion of the engaging portion 74 is long enough to permit its frusto-conical portion to protrude upwards from the upper surface of the flanged portion 86.

An urging means or compression spring 70 is received beneath the center spindle 72 and within the cylindrical bore 88. The rotating shaft 68 of the motor 62 has a diameter substantially equal to the diameter of the cylindrical bore 88 and is inserted into the cylindrical bore 88. The rotating shaft 68 is fixed by a bolt 69 to the rotating shaft portion 84 of the rotating member 82. Accordingly, the rotating member 82 is driven by the rotation of the rotating shaft 68 of the motor 62. The center spindle 72 is urged, by a spring 70 mounted between the base portion 76 and the rotating shaft 68, in the upward direction or in a direction in which the engaging portion 74 is allowed to protrude from the flanged portion 86.

The operation of the magnetic disc apparatus having the foregoing construction will now be described. FIG. 7 shows a state wherein the disc cassette 30 has been inserted into the cassette holder 52, and this cassette holder is tilted to permit the floppy disc 40 to be coupled to the driving means 60. The engaging portion 74 of the center spindle 72 is partially inserted into the central bore 46 of the disc holder 44 of the floppy disc 40. The disc holder 44 formed of magnetic material is magnetically attracted to the ring-like magnet 92 received within the recess 90 of the flanged portion 86, whereby the disc holder 44 is fixedly coupled to the flanged portion 86. In this case, the peripheral edge portion of the underside of the disc holder 44 is superposed upon the upper surface of the flanged portion 86. The vertical position of the floppy disc 40 is thereby precisely set to a specified location. On the other hand, while the part of the engaging portion 74 of the center spindle 72 is inserted into the central bore 46 of the disc holder 44, the center spindle 72 is urged downward, by the magnetic force of the magnet 92, against the elastic force of the spring 70. Thus, the peripheral edge of the lower end of the central bore 46 is brought into contact with the circumferential surface of the frusto-conical portion of the engaging portion 74. Accordingly, the horizontal position of the floppy disc 40 is defined by the center spindle 72, and the center of the floppy disc 40 is brought into alignment with the rotational center of the center spindle 72. In this case, even when the diameter of the central bore 46 or the outer diameter of the engaging portion 74 varies somewhat, the center of the disc holder 44 is always kept in alignment with the center of the center spindle 72, although only the vertical position of engagement between the central bore 46 and the engaging portion 74 taken in the axial direction of the center spindle 72 may be varied. For this reason, the center of the floppy disc 40 is brought precisely into coincidence with the rotational center of the center spindle 72. It is to be noted that the cassette case 32 is positioned and retained at a specified location by means of the elastic piece 56 and the pin 58. By driving the motor 62, the rotating member 82 is driven to rotate through the rotating shaft 68. As the rotating member 82 rotates, the disc holder 44 fixed to the rotating member 82 by the action of the magnet 92 is allowed to rotate, whereby the floppy disc 40 is also driven to rotate.

Another embodiment of the invention will now be described with reference to FIG. 8. In FIG. 8, only the respective portions of the rotating member 82 and the center spindle 94 which adjoin each other are shown, and those portions which are the same as shown in FIGS. 1 to 7 are assigned the same notations and description thereof will be omitted. In this embodiment, only the center spindle 94 differs from that shown in FIGS. 1 to 7. The center spindle 94 is spherical and has a diameter permitting its sliding movement within the cylindrical bore 88. The center spindle 94 has a bore 96 piercing through its center and extending in its longitudinal direction. A slender pin 98 with a stopper 100 formed at its upper end is allowed to pierce the bore 96 of the spherical center spindle 94 and is fixed to the upper surface of the rotating shaft 68 of the motor 62. The center spindle 94 urged upward by means of the compression spring 70 mounted between the center spindle 94 and the rotating shaft 68, and the upward movement thereof is stopped by means of the stopper 100. When the disc holder 44 is fixed by the magnet 92 to the flanged portion 86, the center spindle 94 is brought into engagement with the central bore 46 and the center spindle 94 is thus slightly pushed into the central bore 88. In this case, the upper semi-spherical portion of the spherical center spindle 94 functions as the engaging portion while the largest-diameter portion thereof (taken horizontally) serves as the base portion. In this embodiment, the same effect as obtained with the embodiment shown in FIGS. 1 to 7 is obtained.

In each of the above-mentioned embodiments, the ring-shaped magnet 92 was used as the retainer means and the disc holder 44 was fixed to the flanged portion 86 by the magnetic force of the magnet 92. However, the retainer means is not limited to the magnet. For example, the device may be arranged such that a pressure member for pressing the disc holder 44 of the floppy disc 40 toward the rotating member 82 is provided in the cassette holder 52 and an opening is formed at the center of the cassette case 32, whereby the disc holder 44 is pressed downwards by the pressure member through that opening. The disc holder 44 may have a central frusto-conical bore instead of the cylindrical bore 46 (see FIG. 7). The frusto-conical portion of the engaging portion 74 is fitted into the frusto-conical bore of the disc holder 44. The engaging portion may be made spherical or hemispherical instead of frusto-conical.

What is claimed is:
1. A magnetic disc apparatus comprising:
a magnetic recording disc member having a magnetic recording disc medium onto or from which information is written or read, and a disc holder having a shape of a circular plate mounted on the magnetic recording disc medium, said disc holder having a cylindrical engaging bore at a position correspond- ing to a central position of the magnetic recording disc medium; and driving means, for supporting and driving the magnetic recording disc member, said driving means having a rotating member including a disc holder engagement portion for permitting the disc holder to engage therewith, a cylindrical rotating shaft portion and a cylindrical bore formed in the rotating member coaxial with the rotating shaft portion, the disc holder engagement portion having a flanged portion formed at one end of the rotating shaft portion and a recess on a surface of the flanged portion, an engaging member having a base portion fitted into the cylindrical bore and movable axially therein, and an engaging portion provided at one end of the base portion and extending from the cylindrical bore to be inserted into the engaging bore to engage said engaging bore, a compression spring received within said cylindrical bore for urging the engaging member in the insertion direction of the engaging portion, a magnet received in the recess of the disc holder engagement portion for retaining the disc holder by having the same superposed onto the flanged portion, and a driving member, which has a motor and a driving shaft for the motor, for rotating the rotating member, a tip end of the driving shaft being fitted into the cylindrical bore so that the compression spring is mounted between the tip end of the driving shaft and the base portion of the engaging member.

2. The magnetic disc apparatus according to claim 1, wherein the engaging portion has a frusto-conical portion having at the side of its tip end a diameter smaller than the diameter of the engaging bore and at the side of its base end a diameter larger than the diameter of the engaging bore.

3. The magnetic disc apparatus according to claim 1, wherein the engaging portion has a semi-spherical portion having a diameter larger than the diameter of the engaging bore.

* * * * *